United States Patent
Zittel

(10) Patent No.: US 8,599,254 B2
(45) Date of Patent: Dec. 3, 2013

(54) SPOTLIGHT WITH SECURITY CAMERA

(76) Inventor: Michael Zittel, Rockford, IL (US)

( * ) Notice: Subject to any disclaimer, the term of this patent is extended or adjusted under 35 U.S.C. 154(b) by 328 days.

(21) Appl. No.: 12/877,626

(22) Filed: Sep. 8, 2010

(65) Prior Publication Data

US 2011/0102587 A1    May 5, 2011

Related U.S. Application Data

(60) Provisional application No. 61/257,082, filed on Nov. 2, 2009.

(51) Int. Cl.
*H04N 7/18* (2006.01)
*H04N 17/00* (2006.01)
*H04N 5/775* (2006.01)
*H04N 5/765* (2006.01)

(52) U.S. Cl.
USPC .......... 348/143; 348/184; 348/155; 386/230; 386/231

(58) Field of Classification Search
USPC ........................................................ 348/143
See application file for complete search history.

(56) References Cited

U.S. PATENT DOCUMENTS

| | | | |
|---|---|---|---|
| 4,063,258 A | 12/1977 | Allen | |
| 5,546,072 A | 8/1996 | Creuseremee et al. | |
| 6,259,476 B1 | 7/2001 | Greene | |
| 6,320,610 B1 | 11/2001 | Van Sant et al. | |
| 6,462,775 B1 * | 10/2002 | Loyd et al. | 348/151 |
| 6,686,952 B1 | 2/2004 | Brazier | |
| 6,812,970 B1 | 11/2004 | McBride | |
| 7,298,969 B2 * | 11/2007 | Elberbaum | 396/28 |
| 2002/0014971 A1 * | 2/2002 | Ferraro | 340/689 |
| 2004/0179093 A1 | 9/2004 | Inan | |
| 2007/0075855 A1 * | 4/2007 | Chen | 340/541 |
| 2007/0109407 A1 * | 5/2007 | Thompson | 348/143 |
| 2007/0297788 A1 * | 12/2007 | Wahl et al. | 396/419 |
| 2008/0084787 A1 * | 4/2008 | Graber | 367/96 |
| 2008/0247447 A1 * | 10/2008 | Abraham et al. | 375/222 |
| 2008/0309672 A1 * | 12/2008 | Drive et al. | 345/519 |
| 2010/0118533 A1 * | 5/2010 | Hemby | 362/245 |

OTHER PUBLICATIONS www.spyville.com.

* cited by examiner

*Primary Examiner* — Joseph Ustaris
*Assistant Examiner* — Jill Sechser
(74) *Attorney, Agent, or Firm* — James Ray & Assoc

(57) ABSTRACT

An outdoor surveillance and lighting apparatus. The apparatus includes a housing having at least one side portion, a front end and a back end. There is a substantially unidirectional main light and at least one surveillance camera disposed within the housing. The lens of the camera is aimed in a direction substantially normal to the main light direction. Also included is a video transmitting means connected to the surveillance camera for conveying video images to a remote viewing unit.

16 Claims, 3 Drawing Sheets

SPOTLIGHT WITH SECURITY CAMERA

CROSS REFERENCE TO RELATED APPLICATION

This patent application is related to and claims priority from U.S. Provisional Patent Application Ser. No. 61/257,082 filed Nov. 2, 2009.

FIELD OF THE INVENTION

The present invention relates, in general, to outdoor security cameras and, more particularly, this invention relates to covert security cameras in landscape and outdoor building lighting.

BACKGROUND OF THE INVENTION

Prior to the conception and development of the present invention, outdoor flood lights and spotlights have been popular with home and office owners for after-dark lighting of flags, signs, displays, landscaping, building facades, and walkways. The lights can be mounted on buildings or on ground pegs. It has been known in the art to combine security cameras with outdoor spotlights, such as those found at www.spyville.com.

Combining a spotlight with a camera was taught by Allen in U.S. Pat. No. 4,063,258, in particular for vehicle use. In U.S. Pat. No. 6,259,476, Greene discloses a covert camera within a light fixture, also teaching capturing heat from the light for mitigation of cold weather effects. Van Sant et al. in U.S. Pat. No. 6,320,610 teaches multiple rotatable hidden cameras within a compact device. In U.S. Pat. No. 6,462,775, Loyd et al. discloses a covert surveillance system for viewing images sent to a radio receiver from a remote location such as a street lamp. In U.S. Pat. No. 7,298,969, Elberbaum discloses an upright camera housing for installing on a vertical structure such as a fence post. A common drawback with all this prior art is that the field that the camera views is much the same as that lit by the associated lighting. This makes it easier for an intruder or vandal to evade the sight of the camera by staying away from the path of the lighting.

SUMMARY OF THE INVENTION

The present invention provides an outdoor surveillance and lighting apparatus and includes a housing having at least one side portion, a front end, and a back end; a substantially unidirectional light emitter; at least one surveillance camera within the housing, wherein a lens of said camera aims in a direction substantially normal; and, a video transmitting means connected to the surveillance camera for conveying a video images to a remote viewing unit.

In a preferred embodiment, the housing is mounted on a ground stake with the light emitter providing accent lighting to a building or landscape.

OBJECTS OF THE INVENTION

It is, therefore, one of the primary objects of the present invention to provide an outdoor lighting fixture with inconspicuous security cameras that are pointed in directions generally normal to that in which the light shines.

Another object of the present invention is to provide outdoor accent lighting that can covertly contain cameras viewing fields unexpected by intruders.

Still another object of the present invention is to provide a covert security camera with wireless transmission.

Yet another object of the present invention is to provide 24-hour surveillance outside a building in unexpected viewing directions.

In addition to the various objects and advantages of the present invention described with some degree of specificity above, it should be obvious that additional objects and advantages of the present invention will become more readily apparent to those persons who are skilled in the relevant art from the following more detailed description of the invention, particularly, when such description is taken in conjunction with the attached drawing figures and with the appended claims.

Figure 1:
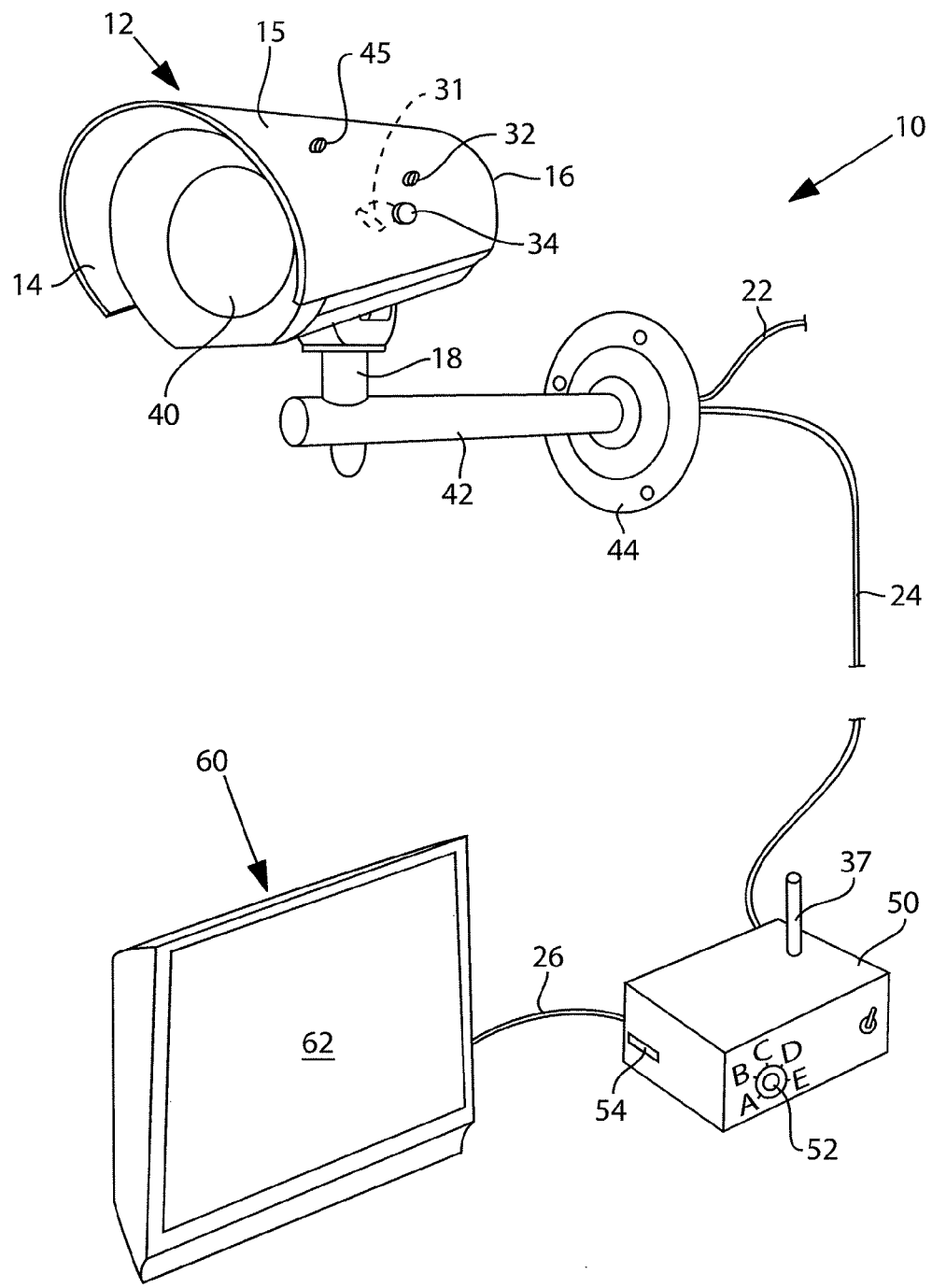
FIG. 1 provides a perspective view of an embodiment of the present invention with a building mount option.

DETAILED DESCRIPTION OF A PRESENTLY PREFERRED AND VARIOUS ALTERNATIVE EMBODIMENTS OF THE INVENTION

Prior to proceeding to the more detailed description of the present invention it should be noted that, for the sake of clarity and understanding, identical components which have identical functions have been identified with identical reference numerals throughout the several views illustrated in the drawing figures. For the purposes of the specification and claims herein, substantially unidirectional light shall be taken to mean shining in a single direction and essentially confined to within 45 degrees of the central axis of the light beam.

Referring initially to FIG. 1, this provides a perspective view of an embodiment of the present invention, generally shown as 10, with an exemplary mount option using a wall mount plate 44 and a support arm 42. A light/camera housing 12 has a front end 14, at least one side portion 15, and a back end 16. A surveillance camera 31 within the housing 12 has an inconspicuous lens 34 along the side portion 15 such that the sight line through the lens 34 is substantially normal to the axis of the substantially unidirectional main light 40. Typically, there is a twin camera and lens on another part of the side portion 15 aimed about 180 degrees away from the shown lens 34. The main light 40 is positioned adjacent the front end 14 and is typically unidirectional, either a spotlight or directional floodlight. The main light 40 can be either an individual lamp or a plurality of light-emitting diodes (LED). A low-light sensor 45 generally activates the main light. Power to units within the light/camera housing 12 is provided by electrical wiring 22, and the images from the camera 31 are transmitted along cable 24 to a control box 50 having a selector switch 52 to pick which video signals from multiple cameras to send via cable 26 to the video monitor 60 such that outside activity can be seen on the video screen 62. There is an option selectable by the selector switch 52 to display multiple cameras simultaneously with the screen 62 divided into quadrants. Camera input to the control box 50 can also come via an antenna 37 from outdoor wireless cameras. A USB connection offers recording options on a computer or one of many portable storage devices. Another option is providing small LED lights 32 on the side portion to provide supplemental yet minimal light for the cameras 34.

Figure 2:
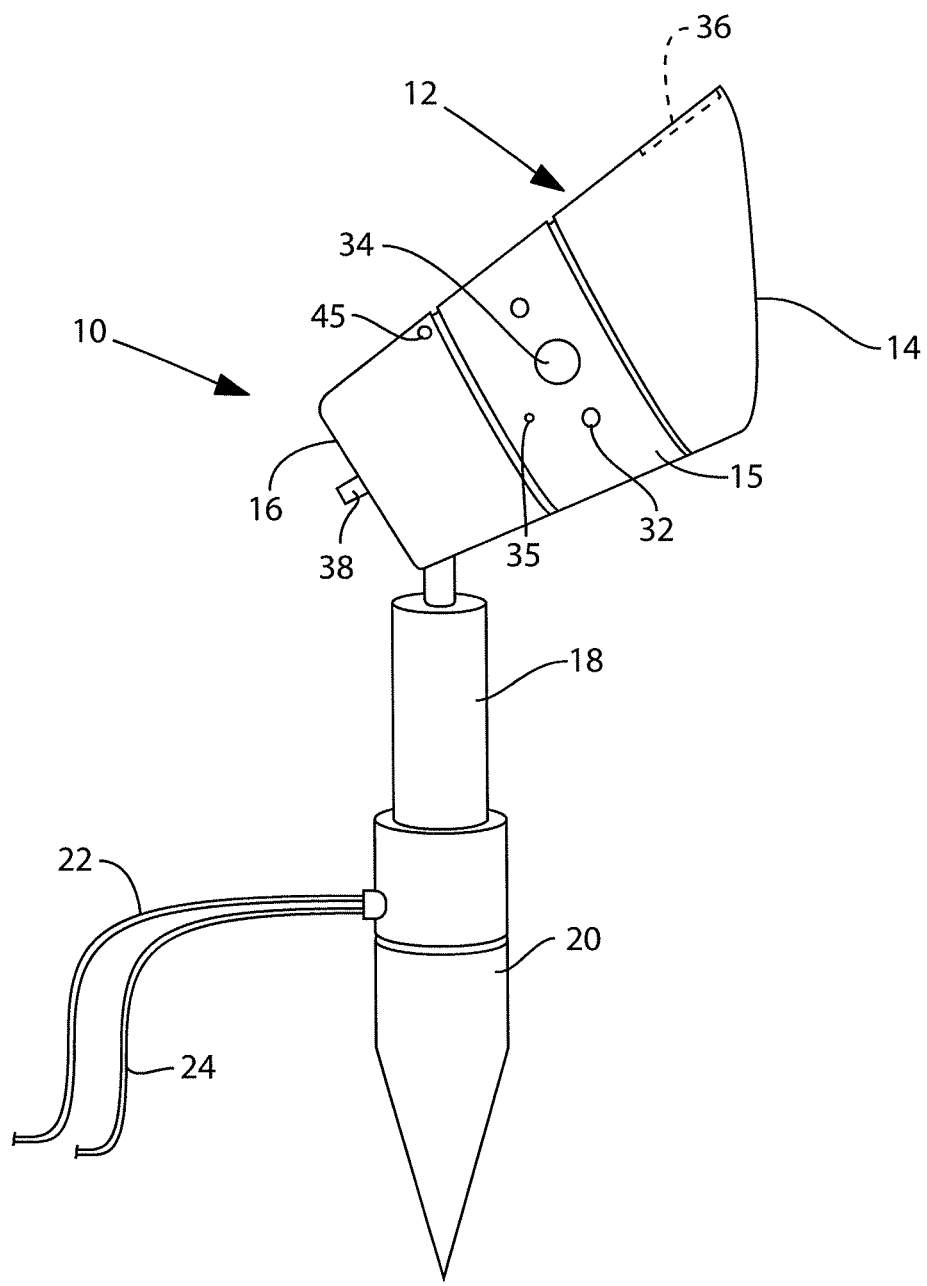
FIG. 2 is an elevation view of a preferred embodiment for the present invention with a ground mount option.

FIG. 2 is an elevation view of the present invention, generally shown as 10, with a ground mount option. An outdoor accent light housing 12, with built in camera having lens 34, has a front end 14, a back end 16, and at least one side portion 15. The light/camera combination 12 is generally mounted on a support arm 18 adjacent the back end 16, and this connects to a ground stake 20 or a pole. Electric power, either 12 V or 120 V, is supplied via cable 22. The video, and optional audio, typically feed back to a remote monitor via cable 24. As an option to video feed line 24, transmission may be wireless via a concealed antenna 36. Optional accessories are LED lights 32, to provide auxiliary light for the camera lens 34, and a microphone 35. Preferably, each LED light 32 is a cluster of 3 LED's. A second camera on the side portion 15 about 180 degrees from the first camera 34 is another option. Camera lens 34 has a viewing direction approximately 90 degrees from the direction of light emanating from the front end 14. An optional motion detector 38 can send a signal to inside an adjacent building to initiate recording and/or sound an alarm.

Figure 3:
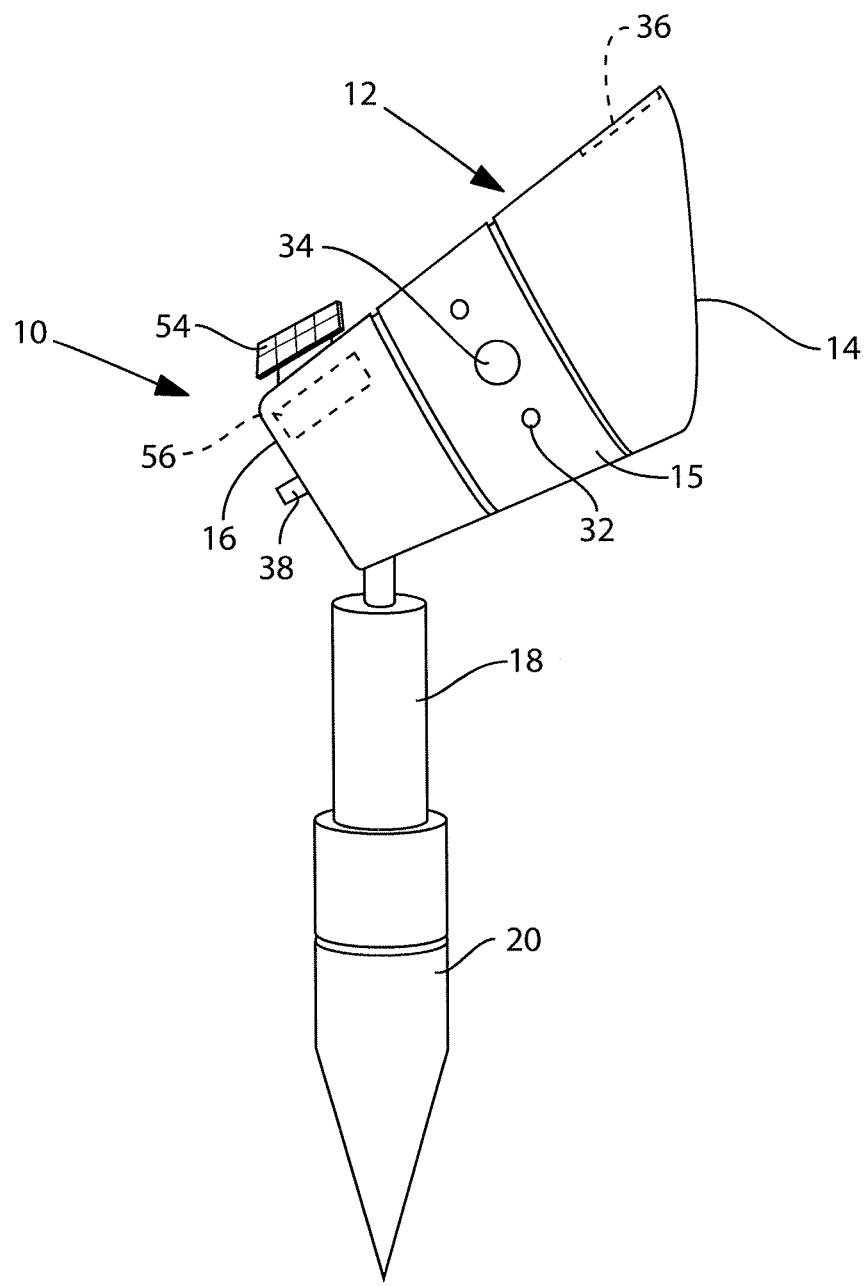
FIG. 3 provides an elevation view of an alternative embodiment of the present invention.

FIG. 3 provides an elevation view of an alternative embodiment of the present invention, generally indicated by 10. This embodiment enables a totally wireless outdoor installation by adding a solar panel 54 and internal rechargeable batteries 56, which can be located at any of many possible locations on at least one side portion 15 of the housing 12. Transmissions from the camera behind lens 34 are sent via an antenna 36 to a receiver control box as illustrated in FIG. 1. An optional motion detector 38 can send a signal to inside an adjacent building to initiate recording and/or sound an alarm. The light/camera housing 12 can be mounted on a portion of a structure or on the ground with the aid of a ground stake 20.

While a presently preferred and various alternative embodiments of the present invention have been described in sufficient detail above to enable a person skilled in the relevant art to make and use the same, it should be obvious that various other adaptations and modifications can be envisioned by those persons skilled in such art without departing from either the spirit of the invention or the scope of the appended claims.

What is claimed is:

1. An outdoor surveillance and lighting apparatus comprising:
    a) a single housing having a front end, a back end, and an exterior surface;
    b) a light mounted inside said single housing and configured such that said light shines in a single direction through said front end;
    c) a surveillance camera disposed within said single housing and having a lens thereof disposed on said exterior surface, wherein said lens of said surveillance camera has a sight line generally normal to said single direction of said light; and
    d) a video transmitting means connected to said surveillance camera for conveying video images to a remote viewing unit.

2. The outdoor surveillance and lighting apparatus, according to claim 1, wherein said video transmitting means is an elongated underground cable.

3. The outdoor surveillance and lighting apparatus, according to claim 1, wherein said video transmitting means is a wireless transmitting apparatus with an antenna hidden within said housing.

4. The outdoor surveillance and lighting apparatus, according to claim 1, wherein said single housing holds a second surveillance camera having a sight line thereof aimed about 180 degrees from said sight line of said surveillance camera.

5. The outdoor surveillance and lighting apparatus, according to claim 1, wherein said video transmitting means is a wire cable.

6. The outdoor surveillance and lighting apparatus, according to claim 1, wherein said single housing further holds between one and twelve light emitting diodes adjacent said lens.

7. The outdoor surveillance and lighting apparatus, according to claim 1, wherein said single housing is engageable with a ground stake.

8. The outdoor surveillance and lighting apparatus, according to claim 1, wherein said remote viewing unit has a display means included for viewing multiple camera images simultaneously.

9. The outdoor surveillance and lighting apparatus, according to claim 1, wherein said light is activated by a low-light sensor.

10. The outdoor surveillance and lighting apparatus of claim 1, further comprising a solar panel and a rechargeable battery coupled to said solar panel.

11. An outdoor surveillance and lighting apparatus comprising:
    a) a single housing having at least one side portion, a front end, and a back end;
    b) a single light inside said housing configured such that said single light shines in a single direction from said front end;
    c) two surveillance cameras within said side portion of said housing and aimed about 180 degrees from each other and generally normal to said single direction of said single light; and
    d) a video transmitting means connected to said surveillance camera for conveying video images to a remote viewing unit, wherein said remote viewing unit has a display means included for viewing images from said two surveillance cameras simultaneously on a single screen.

12. The outdoor surveillance and lighting apparatus of claim 11, further comprising a selector switch operable to display said video images from said two surveillance cameras simultaneously on said single screen and wherein said single screen is divided into quadrants.

13. The outdoor surveillance and lighting apparatus of claim 11, further comprising a selector switch operable to select video signals from said two surveillance cameras.

14. An outdoor surveillance and lighting apparatus comprising:
    a) a single housing having at least one side portion, a front end, and a back end;
    b) a single light inside said housing configured such that said single light shines in a single direction from said front end; and
    c) surveillance camera within said side portion of said housing, wherein a lens of said surveillance camera has a sight line generally normal to said single direction of said single light.

15. The outdoor surveillance and lighting apparatus of claim 14, wherein said apparatus further comprises a display configured to view images from said at least one surveillance camera on a single screen and a control box coupled intermediate said display and said at least one surveillance camera.

16. The outdoor surveillance and lighting apparatus of claim 15, wherein said control box further includes a selector switch.

* * * * *